(12) United States Patent
Piccirillo et al.

(10) Patent No.: US 8,458,377 B2
(45) Date of Patent: Jun. 4, 2013

(54) DMA ENGINE CAPABLE OF CONCURRENT DATA MANIPULATION

(75) Inventors: Gary Piccirillo, Cypress, TX (US); David M. Olson, The Woodlands, TX (US)

(73) Assignee: LSI Corporation, San Jose, CA (US)

(*) Notice: Subject to any disclaimer, the term of this patent is extended or adjusted under 35 U.S.C. 154(b) by 313 days.

(21) Appl. No.: 12/718,279

(22) Filed: Mar. 5, 2010

(65) Prior Publication Data

US 2011/0219150 A1    Sep. 8, 2011

(51) Int. Cl.
*G06F 13/28*    (2006.01)

(52) U.S. Cl.
USPC ............................................... 710/24; 710/22

(58) Field of Classification Search
None
See application file for complete search history.

(56) References Cited

U.S. PATENT DOCUMENTS

| | | | |
|---|---|---|---|
| 5,448,702 A * | 9/1995 | Garcia et al. .................. | 710/100 |
| 5,535,348 A * | 7/1996 | Leach et al. ................... | 712/241 |
| 5,608,891 A * | 3/1997 | Mizuno et al. ................ | 711/114 |
| 6,324,594 B1 * | 11/2001 | Ellis et al. ......................... | 710/5 |
| 6,330,374 B1 | 12/2001 | Yamaguchi et al. | |
| 6,336,150 B1 * | 1/2002 | Ellis et al. ......................... | 710/5 |
| 6,411,984 B1 * | 6/2002 | Leach et al. .................. | 709/200 |
| 6,449,666 B2 * | 9/2002 | Noeldner et al. ............... | 710/23 |
| 6,609,167 B1 * | 8/2003 | Bastiani et al. ............... | 710/104 |
| 6,636,922 B1 * | 10/2003 | Bastiani et al. ............... | 710/305 |
| 6,772,310 B2 * | 8/2004 | Thompson et al. ........... | 711/166 |
| 6,898,646 B1 * | 5/2005 | Bonola et al. ................... | 710/22 |
| 6,925,519 B2 * | 8/2005 | Day et al. ....................... | 710/315 |
| 7,003,702 B2 * | 2/2006 | Budd et al. ....................... | 714/52 |
| 7,089,391 B2 | 8/2006 | Geiger et al. | |
| 7,181,578 B1 * | 2/2007 | Guha et al. ..................... | 711/154 |
| 7,200,691 B2 | 4/2007 | Ali Khan et al. | |
| 7,219,169 B2 | 5/2007 | Lee et al. | |
| 7,302,503 B2 | 11/2007 | MacInnis | |
| 7,421,520 B2 * | 9/2008 | Wilkins et al. .................. | 710/36 |

(Continued)

FOREIGN PATENT DOCUMENTS

WO    9917212    4/1999

OTHER PUBLICATIONS

European Search Report in EP Application Serial No. 11157074.3, issued Jun. 28, 2011.

*Primary Examiner* — Kris Rhu
(74) *Attorney, Agent, or Firm* — Christopher P. Whitham; Cochran Freund & Young LLC

(57) ABSTRACT

Disclosed is a method and device for concurrently performing a plurality of data manipulation operations on data being transferred via a Direct Memory Access (DMA) channel managed by a DMA controller/engine. A Control Data Block (CDB) that controls where the data is retrieved from, delivered to, and how the plurality of data manipulation operations are performed may be fetched by the DMA controller. A CDB processor operating within the DMA controller may read the CDB and set up the data reads, data manipulation operations, and data writes in accord with the contents of the CDB. Data may be provided from one or more sources and data/modified data may be delivered to one or more destinations. While data is being channeled through the DMA controller, the DMA controller may concurrently perform a plurality of data manipulation operations on the data, such as, but not limited to: hashing, HMAC, fill pattern, LFSR, EEDP check, EEDP generation, XOR, encryption, and decryption. The data modification engines that perform the data manipulation operations may be implemented on the DMA controller such that the use of memory during data manipulation operations uses local RAM so as to avoid a need to access external memory during data manipulation operations.

17 Claims, 10 Drawing Sheets

U.S. PATENT DOCUMENTS

| | | |
|---|---|---|
| 7,565,462 B2 | 7/2009 | MacInnis |
| 7,596,639 B2 * | 9/2009 | Ellis et al. .................. 710/22 |
| 7,716,389 B1 | 5/2010 | Bruce et al. |
| 7,779,082 B2 * | 8/2010 | Maki et al. ................. 709/212 |
| 7,934,021 B2 * | 4/2011 | Elzur et al. ................. 709/250 |
| 2006/0123152 A1 * | 6/2006 | Koch et al. ................. 710/22 |
| 2007/0088864 A1 * | 4/2007 | Foster ........................ 710/22 |
| 2007/0130384 A1 * | 6/2007 | Go et al. .................... 710/22 |
| 2008/0181245 A1 | 7/2008 | Basso et al. |
| 2008/0209084 A1 * | 8/2008 | Wang et al. ................. 710/22 |
| 2009/0006810 A1 | 1/2009 | Almasi et al. |
| 2009/0248910 A1 | 10/2009 | Conroy et al. |

* cited by examiner

600 BLOCK DIAGRAM OF AN EMBODIMENT OF A DMA CONTROLLER SYSTEM THAT ENCRYPTS, XOR'S, AND PERFORMS AN EEDP CHECK AND UPDATE CYCLE

700 BLOCK DIAGRAM OF AN EMBODIMENT OF A DMA CONTROLLER SYSTEM THAT XOR'S AND PERFORMS AN EEDP CHECK AND UPDATE CYCLE

FIG. 8  BLOCK DIAGRAM OF AN EMBODIMENT OF A RAID-ON-A-CHIP SYSTEM INCLUDING A DMA CONTROLLER

DMA ENGINE CAPABLE OF CONCURRENT DATA MANIPULATION

BACKGROUND OF THE INVENTION

Direct Memory Access (DMA) is an essential feature of modern computers. DMA permits particular hardware subsystems of a computer to have read and/or write access to system memory independent of the Central Processing Unit (CPU). Some example hardware systems that may use DMA include, but are not limited to: disk drive controllers, RAID (Redundant Array of Independent Disks)-On-a-Chip (ROC) controllers, graphics cards, network cards, and sound cards. DMA may also be used for intra-chip data transfer on multi-core processors. Management and implementation of a DMA channel is typically performed by a DMA controller. Many times the DMA controller is equipped with local memory such that the DMA controller transfers data to and from the local DMA memory and the external main memory. Since the DMA controller manages the transfer of data and not the computer CPU, the data transfers that use DMA use much less computer CPU processing time, thus, increasing the effective computing power of a computer having a DMA controller. Without DMA, communication with peripheral devices or between cores of a multi-core system may fully occupy the CPU during the entire read/write operation, which makes the CPU unavailable for performing other computing tasks. With DMA, the CPU would initiate the transfer then do other operations while the transfer is in progress, and receive an interrupt from the DMA controller once the operation has been completed. Freeing the CPU from performing the data transfer with peripheral devices is especially important since communication with peripheral devices is typically slower than for normal system Random Access Memory (RAM), so the CPU would be unavailable for even longer periods of time during communication with peripheral devices without the use of a DMA channel managed by a DMA controller.

A typical DMA transfer copies a block of memory from one device to another. The CPU initiates the data transfer, but the CPU does not execute the data transfer itself. For an Industry Standard Architecture (ISA) bus, the data transfer is performed by a DMA controller, which is typically incorporated as part of the computer motherboard chipset. A Peripheral Component Interconnect (PCI) bus uses a bus mastering DMA where the peripheral device takes control of the bus and performs the transfer itself.

An embedded processor may include a DMA engine/controller within the chip to allow the processing element to issue a data transfer while continuing to perform other tasks during the data transfer. When the DMA controller is incorporated within a chip, the DMA controller is commonly referred to as a DMA engine. Multi-core embedded processors often include one or more DMA engines in combination with local DMA memory as subsystems within the chip multi-core processor chip.

SUMMARY OF THE INVENTION

An embodiment of the present invention may comprise a method to perform a plurality of data manipulation operations on data being transferred via a Direct Memory Access (DMA) channel managed by a DMA controller comprising: providing a plurality of data manipulation engines within the DMA controller that each perform at least one of a variety of data manipulation operations; fetching a Control Data Block (CDB) by the DMA controller, the CDB containing instructions for reading the data from at least one data source, performing the plurality of data manipulation operations on the data, and writing the data to at least one destination; retrieving by the DMA controller the data from at least one data source in accord with the instructions encoded in the CDB; performing within the DMA controller each data manipulation operation of the plurality of data manipulation operations on the data received by the DMA controller using one of the plurality of data manipulation engines provided on the DMA controller for each data manipulation operation in accord with the instructions encoded in the CDB such that at least two of the plurality of data manipulation operations are performed concurrently by the DMA controller; and sending by the DMA controller results of the plurality of data manipulation operations to at least one destination in accord with the instructions encoded in the CDB.

An embodiment of the present invention may further comprise a Direct Memory Access (DMA) controller that performs a plurality of data manipulation operations on data being transferred via a Direct Memory Access (DMA) channel managed by the DMA controller comprising: a Control Data Block (CDB) processor subsystem that fetches a Control Data Block (CDB), the CDB containing instructions for reading the data from at least one data source, performing the plurality of data manipulation operations on the data, and writing the data to at least one destination; a fill subsystem that retrieves the data from at least one data source in accord with the instructions encoded in the CDB; a plurality of data manipulation engines within the DMA controller that each perform at least one of a variety of data manipulation operations for each data manipulation operation of the plurality of data manipulation operations on the data received by fill subsystem in accord with the instructions encoded in the CDB such that at least two of the plurality of data manipulation operations are performed concurrently by the DMA controller; and a drain subsystem that sends results of the plurality of data manipulation operations to at least one destination in accord with the instructions encoded in the CDB.

An embodiment of the present invention may further comprise a Direct Memory Access (DMA) controller that performs a plurality of data manipulation operations on data being transferred via a Direct Memory Access (DMA) channel managed by the DMA controller comprising: means for providing a plurality of data manipulation engines within the DMA controller that each perform at least one of a variety of data manipulation operations; means for fetching a Control Data Block (CDB) by the DMA controller, the CDB containing instructions for reading the data from at least one data source, performing the plurality of data manipulation operations on the data, and writing the data to at least one destination; means for retrieving by the DMA controller the data from at least one data source in accord with the instructions encoded in the CDB; means for performing within the DMA controller each data manipulation operation of the plurality of data manipulation operations on the data received by the DMA controller using one of the plurality of data manipulation engines provided on the DMA controller for each data manipulation operation in accord with the instructions encoded in the CDB such that at least two of the plurality of data manipulation operations are performed concurrently by the DMA controller; and means for sending by the DMA controller results of the plurality of data manipulation operations to at least one destination in accord with the instructions encoded in the CDB.

DETAILED DESCRIPTION OF THE EMBODIMENTS

Figure 1:
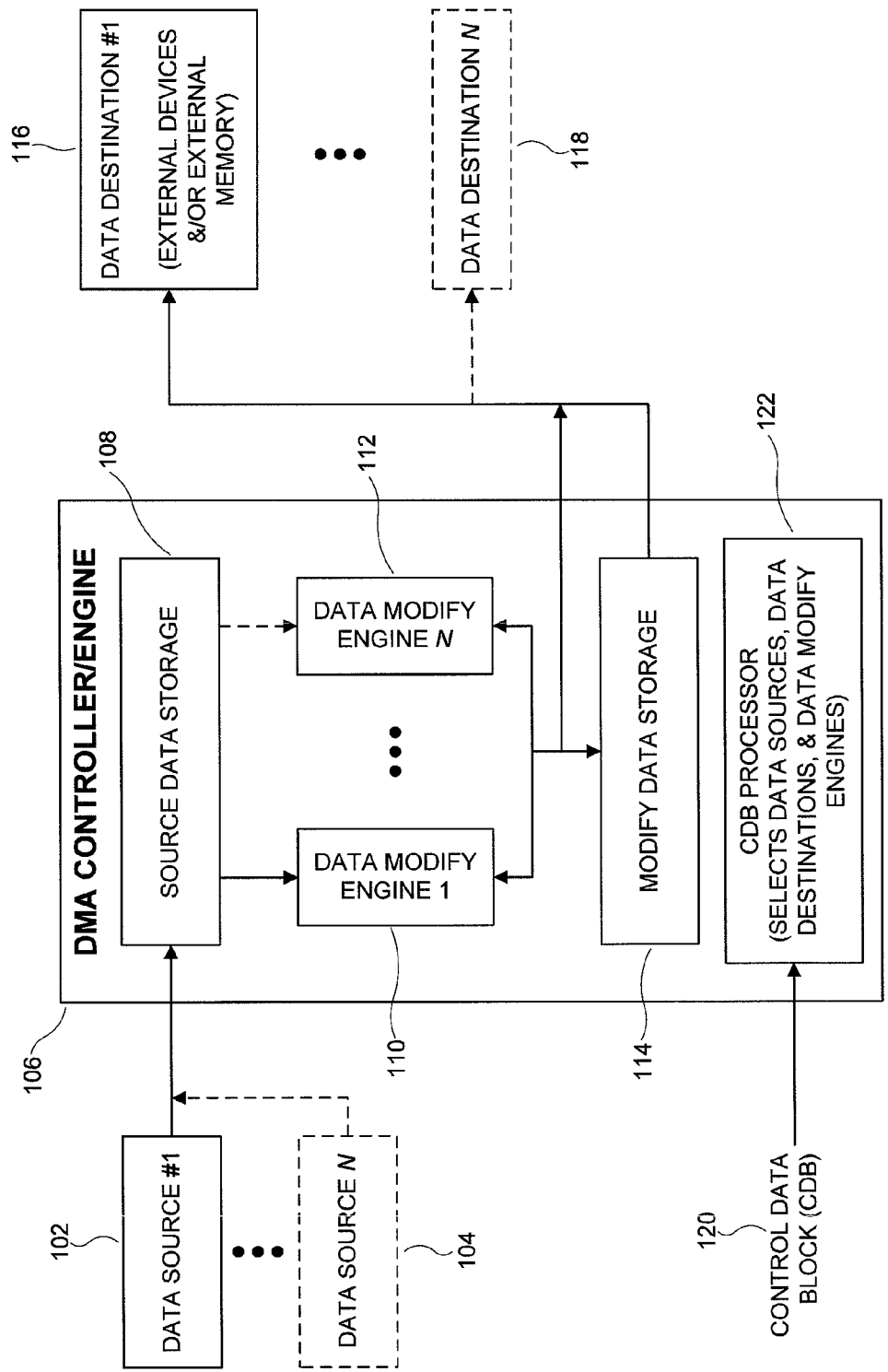
FIG. 1 is a block diagram of an embodiment of a Direct Memory Access (DMA) controller system having a plurality of data modification engines managed in accord with a Control Data Block (CDB).

As modern computer systems become more sophisticated, additional data manipulation operations are expected to be performed on data being transferred within a computer system and to peripheral devices connected to the computer system. For instance, a RAID (Redundant Array of Independent Disks)-On-a-Chip (ROC) system may be expected to perform a number of data manipulation operations on data being transferred as part of the ROC system operations. An ROC system typically includes a Direct Memory Access (DMA) engine/controller as a subsystem within the ROC architecture. Some typical data manipulation operations include: hash, Hash Message Authentication Code (HMAC), hash/HMAC combined, fill pattern, Linear Feedback Shift Register (LFSR), End-to-End Data Protection (EEDP) check/add/update/remove, exclusive OR (XOR), encryption, and decryption. The DMA engine/controller of an embodiment may incorporate performing various data manipulation operations on data being transferred within the DMA engine/controller to reduce processing requirements for other systems/subsystems within a computer system. Further, the DMA engine/controller of an embodiment may concurrently perform a plurality of data manipulations on the data being transferred such that the plurality of data manipulations are performed more quickly than performing the plurality of data manipulation operations one at a time in a serial fashion. Thus, an embodiment allows data to move freely from source to destination with as little interruption as possible. The data manipulation operations performed on the data being transferred by the DMA engine/controller of an embodiment may also store and retrieve data/modified data into memory local to the DMA engine/controller (i.e., local memory) avoiding unnecessary overhead to access memory external to the DMA engine/controller (i.e., external memory).

For example, the DMA engine/controller of an embodiment may encrypt and store data in a first data buffer located in local DMA memory using an encryption engine on the DMA engine/controller. While the encrypted data is being placed into the first data buffer, an XOR engine on the DMA engine/controller may concurrently perform an XOR operation on the encrypted data and store the XOR data in a second data buffer located in local DMA memory without any interruption to the data flow of the encrypted data to the first data buffer. By performing the XOR operation on the encrypted data as the encrypted data is being produced, an embodiment may avoid the latency of waiting for the encrypted data to be completely written to a data buffer before performing the XOR operation. In addition, the DMA engine/controller of an embodiment may also perform EEDP check, add, and/or remove operations in parallel with the encryption and XOR data manipulation operations, further reducing latency involved in performing a plurality of data manipulation operations on data being transferred by a DMA engine/controller.

Various embodiments may be implemented on DMA engines/controllers in a variety of computer systems and electronic devices having DMA engines/controllers. If desired, a computer system and/or electronic device may include multiple DMA engines/controllers if multiple DMA channels are desired. Also, some DMA engines/controllers may provide multiple DMA channels such that including multiple DMA engines/controllers in a system result in a multiplier effect where the number of available DMA channels is a product of the number of DMA engines/controllers times the number of DMA channels available on each DMA engine/controller. DMA controllers for an embodiment may be implemented as separate systems that are incorporated into a computer system and/or electronic device as a separate dedicated computer "card," a separate dedicated chip, or as a separate dedicated electronic device. Often, however, the DMA controller is incorporated as a subsystem, or engine, of a larger multi-function chip, card, or circuitry integrated into a computer system or electronic device. Thus, DMA controllers for an embodiment may be implemented as DMA engine subsystems included within a larger multi-function chip, card, or circuit. Typically, when a DMA controller is included as subsystem of a larger multi-function chip, card, or circuit, the DMA controller is called a DMA engine. Hence, throughout this document, the terms DMA controller and DMA engine will be used interchangeably such that when there is a reference to a DMA controller it is also a reference to a DMA engine and vice versa.

FIG. 1 is a block diagram 100 of an embodiment of a DMA controller system 106 having a plurality of data modification engines 110-112 managed in accord with a Control Data Block (CDB) 120. In the embodiment shown in FIG. 1, a CDB 120 is fetched and received by the DMA controller/engine 106 at a CDB processor 122 subsystem of the DMA controller 106. The CDB processor subsystem 122 operates on and is implemented as part of the DMA controller 106. The CDB contains instructions for a data transfer including the data source(s) 102-104 of the data being transferred/modified, the data manipulation operations desired for the data being transferred, and the data destination(s) 116-118 for the data being transferred/modified. The CDB processor 122 reads the instructions encoded in the CDB 120 and directs the DMA controller 106 to set up and act on a data transfer in accord with the instructions encoded in the CDB 120. Based on the CDB, the DMA controller 106 may prepare and issue read commands to the data source(s) 102-104 to cause the data source(s) 102-104 to send the desired data to the DMA controller 106. The data from the data source(s) 102-104 is received by the DMA controller 106 and stored in source data storage 108 local to the DMA controller 106. Based on the CDB 120, the DMA controller 106 may select a plurality of data modification engines 110-112 to perform the desired data modification operations on the data being transferred via the DMA controller 106. The result data from the data modification engines 110-112 may be delivered directly to the data destinations 116-118 or the result data may be stored in modify data storage 114 local to the DMA controller 106. The result data from the data modification engines 110-112 stored in the modify data storage 114 of the DMA controller 106 may be used by other data modification engines 110-112 or by the original data modification engine (e.g., a data modification engine that performs operations that are dependent on past results) such that the modify data storage 114 may be read and written by the data modification engines 110-112. Once the desired data modification operations are complete, the DMA controller may deliver the data/modified data to the desired data destinations 116-118. In some cases, results of a data modification engine 110-112 may be used only as an intermediary result for use by other data medication engines 110-112. The configuration of the data modification engines 110-112 and which result data from the data modification engines 110-112 is delivered is implemented in accord with the instructions encoded in the CDB 120.

For an embodiment, the data source(s) 102-104 may be any data source 102-104 compatible with typical DMA controllers/engines 106. An embodiment may gather/read data from a single data source 102 or from a plurality of sources 102-104. For instance, source data from a single memory area may be read from external memory (i.e., memory external to the DMA controller 106) and transferred to various data destinations 116-118. Likewise, source data from a multiple memory areas may be read from external and transferred to various data destinations 116-118 in one data transfer operation.

Data modification engines may be created to perform any data modifications desired for data being transferred via a DMA controller/engine 106. For example, some data modification engines may include, but are not limited to: hash, HMAC, hash/HMAC combined, fill pattern, Linear Feedback Shift Register (LFSR), End-to-End Data Protection (EEDP) check/add/update/remove, exclusive OR (XOR), encryption, and decryption. Some types of supported hashing algorithms include the standard Secure Hash Algorithm (SHA)-224, SHA-256, SHA-384, and SHA-512 algorithms which may be performed individually or concurrently by a hash engine. The input data for a data manipulation engine 110-112 may be designated to come from another data manipulation engine 110-112 as an intermediate data result in order to permit multiple data manipulations combined into a single result. The intermediate result may also be sent to one of the destination locations 116-118 if desired as encoded in the CDB 120. However, the intermediate data result does not necessarily need to be sent to a data destination 116-118. When working on data coming from another data manipulation engine, the second data manipulation engine may operate concurrently with the first data manipulation engine, but the second data manipulation may start slightly behind the first data manipulation engine in order to allow the first data manipulation engine to begin streaming intermediate result data before starting the second data manipulation engine calculations. For various embodiments, concurrent operation of data manipulation engines 110-112 may also occur as different data manipulation engines 110-112 perform operations on the same data (intermediate results and/or originally received data) at the same time in parallel. Further, various embodiments may deliver both the original data and the modified data results to the data destinations 116-118.

Various embodiments may implement the local source data storage 108 and the local modify data storage 114 within the DMA controller 106 as one or more local electronic memory circuits. Electronic memory may also be called computer readable memory even though the computer readable (i.e., electronic) memory may be included in electronic devices that require memory storage, but would not typically be considered to be computers. A typical implementation of the electronic memory would be to provide a set of electronic Random Access Memory (RAM) that may be portioned by the DMA controller 106 into source data storage 108 and modify data storage 114. The electronic memory may be in fixed partitions for the source data storage 108 and the modify data storage 114, but the DMA controller may also dynamically allocate the electronic memory RAM as needed for the source data storage and the modify data storage 114 so that the entire electronic memory may be more efficiently utilized. Further, the modify data storage 114 may be subdivided into multiple segments in order to store data from multiple data modify engines 110-112.

Data destinations 116-118 for an embodiment may be any data destination 116-118 compatible with typical DMA controllers/engines 106. Various embodiments may write data and/or modified data results to multiple data destinations 116-118 or to a single data destination 116. Individual data results may be sent to all, or only a subgroup, of the available data destinations 116-118. That is one result may be sent to data destinations 116-118 while other results may be sent only to a single destination 116 or to a subset of destinations 116-118. Typical data destinations 116-118 may include, but are not limited to: disk drives, computer peripherals, a separate external memory segment, and/or other external devices.

Figure 2:
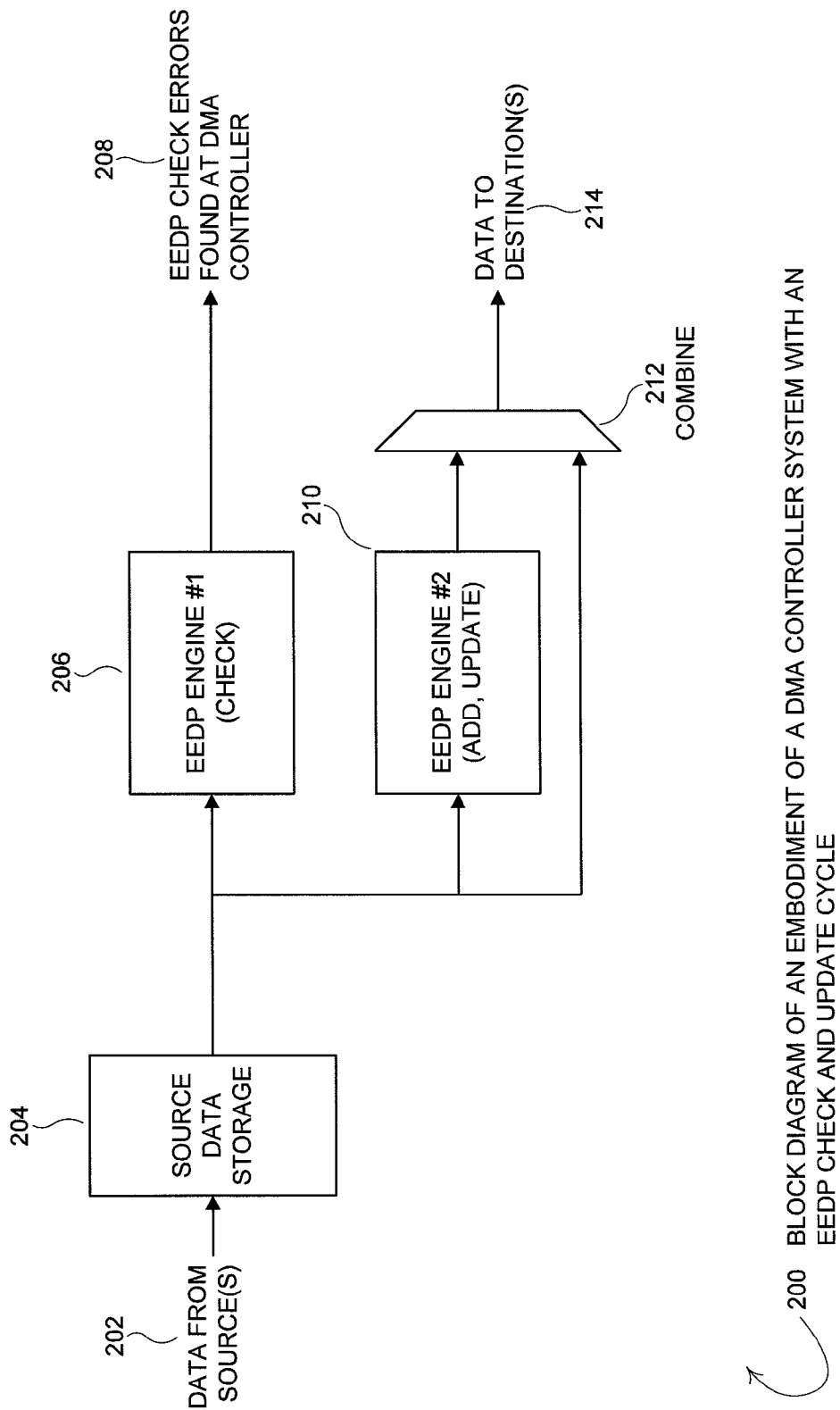
FIG. 2 is a block diagram of an embodiment of a DMA controller system with an End-to-End Data Protection (EEDP) check and update cycle.

FIG. 2 is a block diagram 200 of an embodiment of a DMA controller system with an End-to-End Data Protection (EEDP) check and update cycle. Data from the data source(s) 202 is stored in the source data storage 204 of the DMA controller as the data is received. The first EEDP engine 206 and the second EEDP engine 210 perform operations on the data received from the data source(s) 202 in parallel. The first EEDP engine 206 is a check EEDP engine that checks the Data Protection Information (DPI) embedded in the received data to verify the DPI and reports any errors found 208 to the DMA controller. The errors found by the first EEDP check engine 206 may be recorded by the DMA controller system and/or may generate an interrupt if interrupt functionality is enabled. The second EEDP engine 210 actually combines two EEDP functions to either generate an updated DPI for the transfer data stream or to add the DPI to the transfer data stream. The updated DPI from the second EEDP add/update engine 210 is combined 212 with the original data stream from the data source(s) 202 and sent to the desired destination(s) 214. The combination process 212 may be performed via a multiplexor, as an insertion of packets within the data stream in an identifiable manner, or as otherwise expected by the data destination. Various embodiments may insert the DPI at a block boundary in the transfer data stream in accord with a block size defined by the CDB. When the data byte count for a data stream has been reached for the data being sent to the destination(s) 214, the DPI is inserted. Multiple blocks of data may be moved for a given CDB such that the DPI is inserted into the transfer data stream multiple times for a single data stream.

Figure 3:
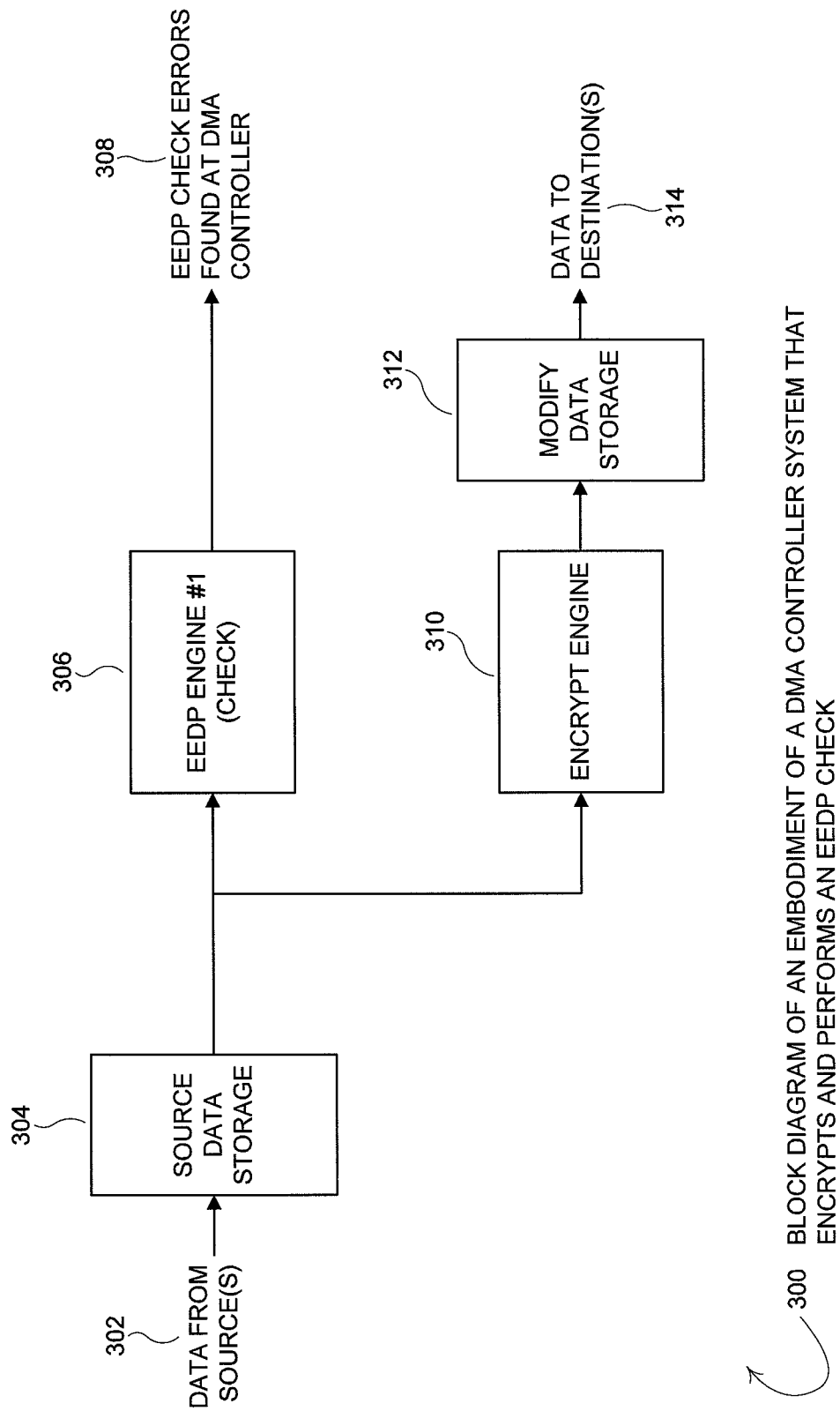
FIG. 3 is a block diagram of an embodiment of a DMA controller system that encrypts data and performs an End-to-End Data Protection (EEDP) check.

FIG. 3 is a block diagram 300 of an embodiment of a DMA controller system that encrypts data and performs an End-to-End Data Protection (EEDP) check. Data from the data source(s) 302 is stored in the source data storage 304 of the DMA controller as the data is received. The EEDP engine 306 and the encrypt engine 310 perform operations on the data received from the data source(s) 302 in parallel. The EEDP engine 306 is a check EEDP engine that checks the DPI embedded in the received data to verify the DPI and reports any errors found 308 to the DMA controller. The errors found by the EEDP check engine 306 may be recorded by the DMA controller system and/or may generate an interrupt if interrupt functionality is enabled. The encrypt engine 310 encrypts the data being sent to the data destination(s) 314 and stores the result in the local modify data storage 312. The encrypted data is delivered from the modify data storage 312 to the data destination(s) 314. Other data modification engines may also be used in similar embodiments as the embodiment 300 shown in FIG. 3. For example, an embodiment may replace the encrypt engine 310 shown in FIG. 3 with a hash or a hash/HMAC combined engine. Similarly, various embodiments may also replace the data modification engines of the embodiments shown in FIGS. 4-7 with different data modification engines. Further, the embodiments shown in FIGS. 2-7 represent only a subset of a large variety of data manipulation engine configurations that may be implemented on the DMA controller. Each CDB delivered to the DMA controller defines the configuration of the data manipulation engines configured on the DMA controller such that the DMA controller may be reconfigured to any of the large variety of data manipulation engine configurations for each CDB received by the DMA controller. For some data manipulation engines used in place of the encrypt engine 310, it may be necessary to store some of the modified data in the local modify data storage 312 so that the data manipulation engine (e.g., a XOR engine) may have access to data that has already been calculated.

Figure 4:
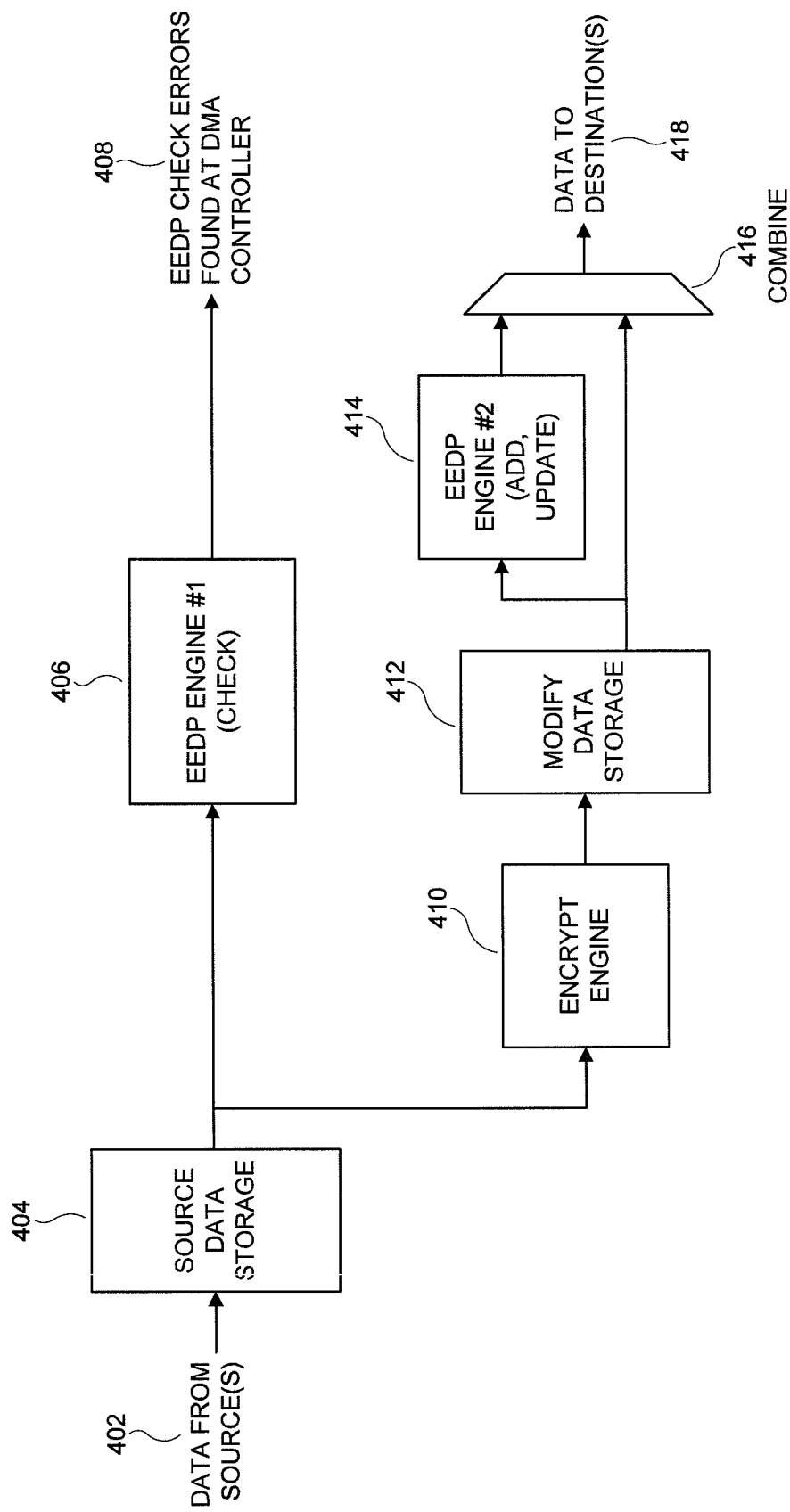
FIG. 4 is a block diagram of an embodiment of a DMA controller system that encrypts data and has an End-to-End Data Protection (EEDP) check and update cycle.

FIG. 4 is a block diagram 400 of an embodiment of a DMA controller system that encrypts data and has an End-to-End Data Protection (EEDP) check and update cycle. Data from the data source(s) 402 is stored in the source data storage 404 of the DMA controller as the data is received. The first EEDP engine 406, the encrypt engine 410 and the second EEDP engine 414 perform operations concurrently. The first EEDP engine 406 is a check EEDP engine that checks the DPI embedded in the received data to verify the DPI and reports any errors found 408 to the DMA controller. The errors found by the first EEDP check engine 406 may be recorded by the DMA controller system and/or may generate an interrupt if interrupt functionality is enabled. The encrypt engine 410 encrypts the data being sent to the data destination(s) 418 and stores the result in the local modify data storage 412. The encrypted data is delivered from the modify data storage 412 to the data destination(s) 418 and to the second EEDP add/update engine 414. The second EEDP engine 414 actually combines two EEDP functions to either generate an updated DPI for the encrypted transfer data stream or to add the DPI to the transfer data stream. The updated DPI from the second EEDP add/update engine 414 is combined 416 with the encrypted data stream from the modify data storage 412 and sent to the desired destination(s) 418. The combination process 416 may be performed via a multiplexor, as an insertion of packets within the data stream in an identifiable manner, or as otherwise expected by the data destination. Various embodiments may insert the DPI at a block boundary in the transfer data stream in accord with a block size defined by the CDB. When the data byte count for a data stream has been reached for the data being sent to the destination(s) 418, the DPI is inserted. Multiple blocks of data may be moved for a given CDB such that the DPI is inserted into the transfer data stream multiple times for a single data stream.

Figure 5:
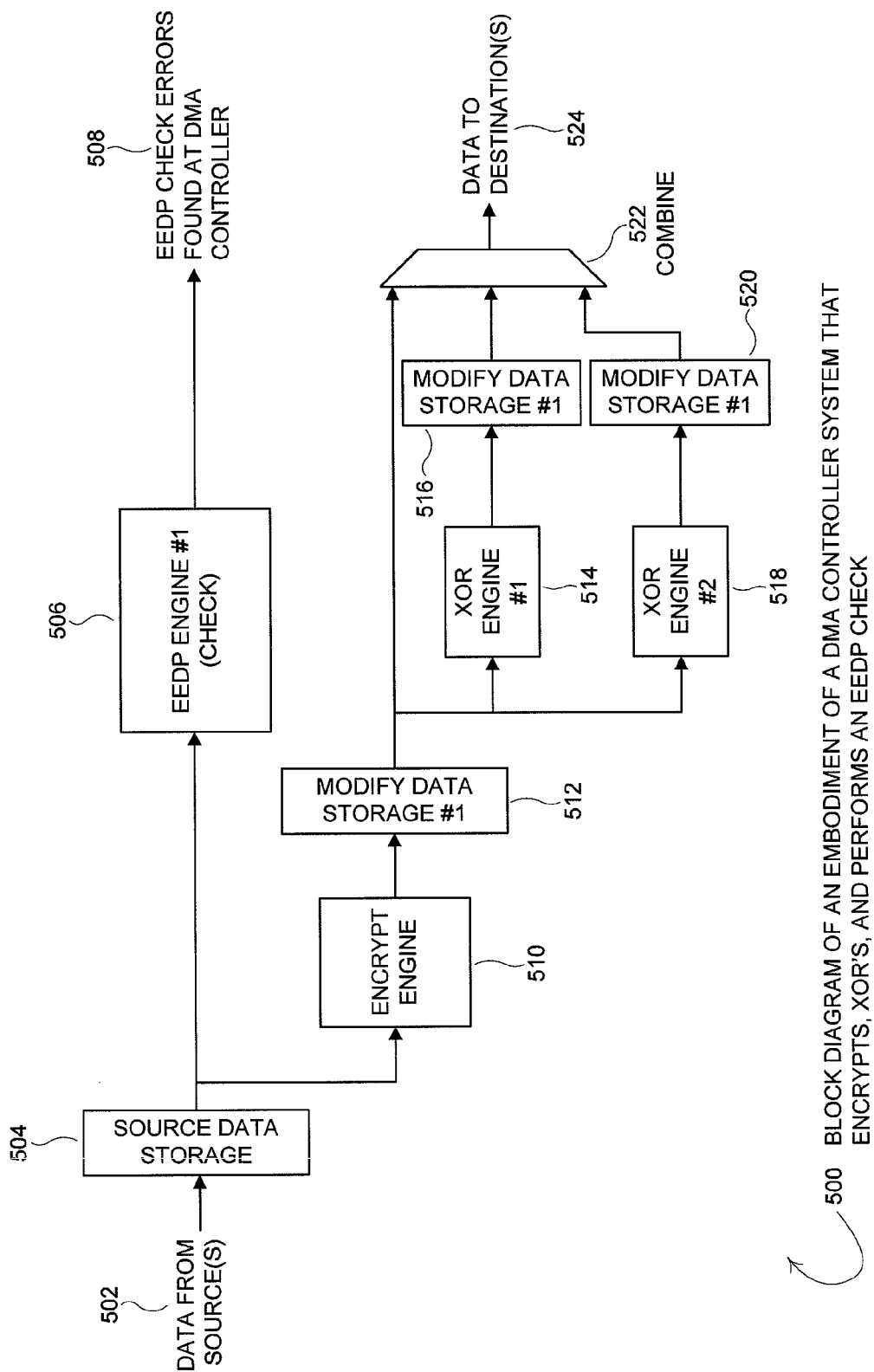
FIG. 5 is a block diagram of an embodiment of a DMA controller system that encrypts data, performs exclusive ORs (XORs) on the data, and performs an End-to-End Data Protection (EEDP) check.

FIG. 5 is a block diagram 500 of an embodiment of a DMA controller system that encrypts data, performs exclusive ORs (XORs) on the data, and performs an End-to-End Data Protection (EEDP) check. Data from the data source(s) 502 is stored in the source data storage 504 of the DMA controller as the data is received. The EEDP engine 506, the encrypt engine 510, and the first 514 and second 518 exclusive OR (XOR) engines perform operations concurrently. The EEDP engine 506 is a check EEDP engine that checks the DPI embedded in the received data to verify the DPI and reports any errors found 508 to the DMA controller. The errors found by the EEDP check engine 506 may be recorded by the DMA controller system and/or may generate an interrupt if interrupt functionality is enabled. The encrypt engine 510 encrypts the data being sent to the data destination(s) 524 and stores the result in the local modify data storage #1 (512). The encrypted data is delivered from the first modify data storage 512 to the data destination(s) 524, and to the first 514 and second 518 XOR engines. Each XOR engine 514 & 518 may need access to already calculated data in order to properly complete the calculations. Hence, the first XOR engine 514 may store result data in the second modify data storage 516. Likewise, the second XOR engine 518 may store result data in the third modify data storage 520. The XOR result data is delivered from the second 516 and third 520 modify data storage to the data destination(s) 524. The encrypted data from the first modify data storage 512, the first XOR data from the second modify data storage 516, and the second XOR data from the third modify data storage 520 are combined 522 and delivered to the data destination(s) 522. The combination process 522 may be performed via a multiplexor, as an insertion of packets within the data stream in an identifiable manner, or as otherwise expected by the data destination(s) 524.

For the embodiment 500 shown in FIG. 5, a fixed portion of data (e.g., 1 kb of data) may be retrieved from each data source 502 one fixed portion of data at a time. Each fixed portion of data is then sent through the encrypt engine 510 and the encrypted result is sent to the designated data destination(s) 524. The XOR processing is performed as the encrypted data is sent from the encrypt engine 510 to the data destination(s) 524 for the encrypted data. Once a fixed portion of data has been retrieved from each data source 502 (e.g., 1 kb of data retrieved from each data source 502) and the encrypted data has been sent to the designated data destination(s) 524 for the encrypt engine 510, the results from the first XOR engine 514 are sent to the designated data destination(s) 524 for the first XOR engine 514. After the first XOR engine 514 results have been sent to the designated data destination(s) 524 for the first XOR engine 514, the second XOR engine 518 results are sent to the designated data destination(s) 524 for the second XOR engine 518. The processing of a fixed amount of data from each data source 502 is repeated until the last fixed amount (or less) of data has been retrieved.

Figure 6:
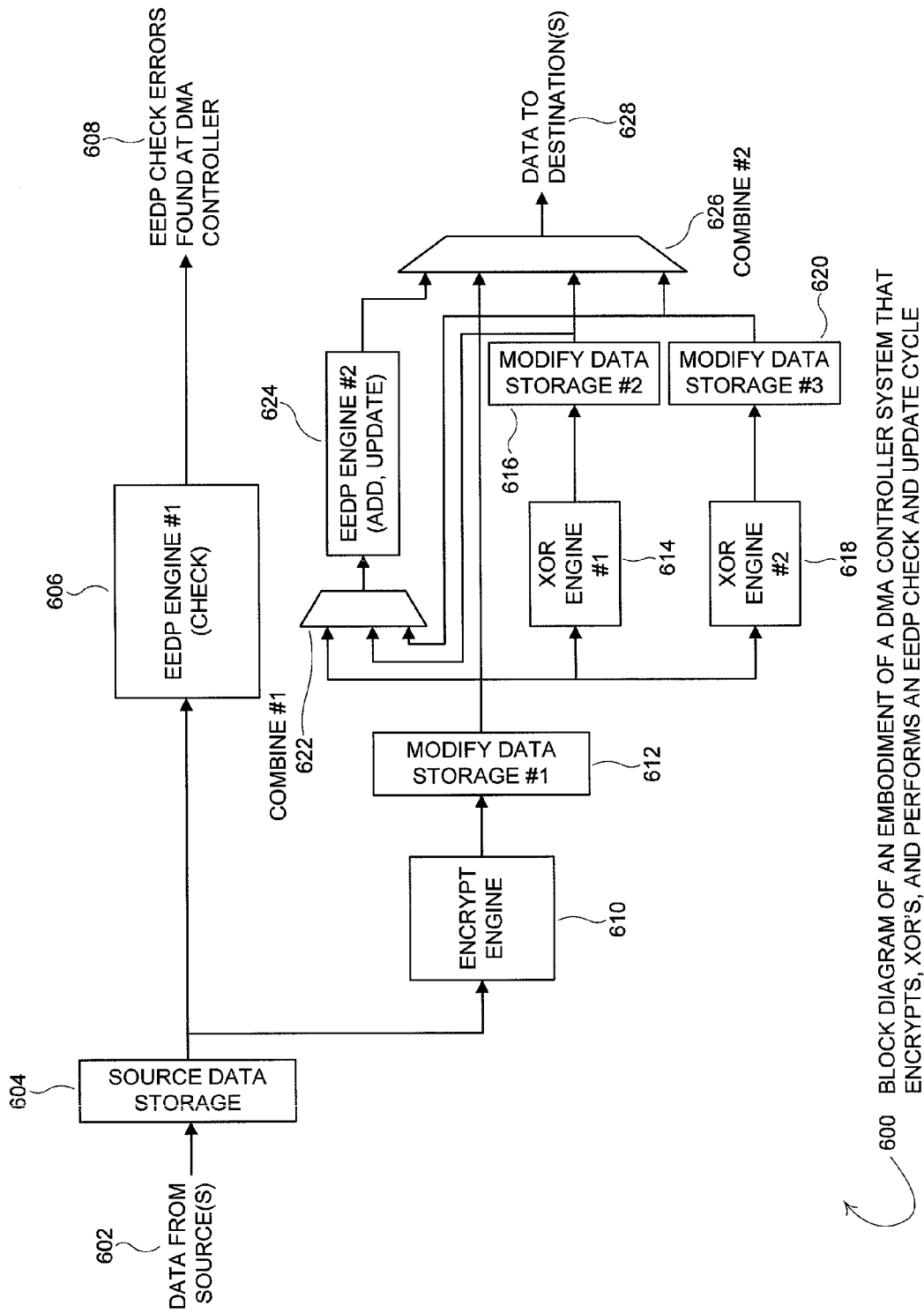
FIG. 6 is a block diagram of an embodiment of a DMA controller system that encrypts data, performs exclusive ORs (XORs) on the data, and has an End-to-End Data Protection (EEDP) check and update cycle.

FIG. 6 is a block diagram 600 of an embodiment of a DMA controller system that encrypts data, performs exclusive ORs (XORs) on the data, and has an End-to-End Data Protection (EEDP) check and update cycle. Data from the data source(s) 602 is stored in the source data storage 604 of the DMA controller as the data is received. The first EEDP engine 606, the encrypt engine 610, the first 614 and second 618 exclusive OR (XOR) engines, and the second EEDP engine 624 perform operations concurrently. The first EEDP engine 606 is a check EEDP engine that checks the DPI embedded in the received data to verify the DPI and reports any errors found 608 to the DMA controller. The errors found by the first EEDP check engine 606 may be recorded by the DMA controller system and/or may generate an interrupt if interrupt functionality is enabled. The encrypt engine 610 encrypts the data being sent to the data destination(s) 628 and stores the result in the local modify data storage #1 (612). The encrypted data is delivered from the first modify data storage 612 to the data destination(s) 628, to the second EEDP add/update engine 624, and to the first 614 and second 618 XOR engines. Each XOR engine 614 & 618 may need access to already calculated data in order to properly complete the calculations. Hence, the first XOR engine 614 may store result data in the second modify data storage 616. Likewise, the second XOR engine 618 may store result data in the third modify data storage 620. The XOR result data is delivered from the second 616 and third 620 modify data storage to the data destination(s) 618 and to the second EEDP add/update engine 624. The encrypted data from the first modify data storage 612, the first XOR data from the second modify data storage 616, and the second XOR data from the third modify data storage 620 are combined and delivered to the second EEDP engine 624. The combination process 622 may be performed via a multiplexor, as an insertion of packets within the data stream in an identifiable manner, or as otherwise expected by the second EEDP engine 624. The second EEDP engine 624 actually combines two EEDP functions to either generate an updated DPI for the encrypted and XOR data streams or to add the DPI to the currently transferring data stream. The updated DPI from the second EEDP add/update engine 624 is combined 626 with the encrypted data stream from the first modify data storage 612, the first XOR data from the second modify data storage 616, and the second XOR data from the third modify data storage 620 and then sent to the desired destination(s) 628. The combination process 626 may be performed via a multiplexor, as an insertion of packets within the data stream in an identifiable manner, or as otherwise expected by the data destination.

In an example operation of a multi source move for the data modification engines of the embodiment shown in FIG. 6, the DMA engine/controller retrieves data from a source and sends it through the encryption engine 610. Simultaneously, the same data is also sent to the first EEDP check engine 606 to verify that the DPI data is correct. After each 16 bytes of the data stream has been encrypted, the encrypted data is sent to three different data modification engines 614, 618, 624 simultaneously in addition to being sent to the data destination 628. The encrypted data is sent to the first XOR engine 614, the second XOR engine 618, and the second EEDP add/update engine 624. The XOR data is stored in associated memory buffers 616 & 620 so that the XOR result can be accumulated as data from different sources 602 is retrieved. The second EEDP add/update engine 624 creates the new DPI that is required as the data is sent to the second EEDP add/update engine 624. When a block boundary is reached (e.g., after 16 bytes), the generated DPI is placed in the data stream that is being sent to the destination 628. The above described processing continues until the data from all the required sources 602 is retrieved, encrypted and XOR'd together. Thus, five different data modification engines are concurrently operating at the same time on the DMA engine/controller. Various embodiments may insert the DPI at a block boundary in the transfer data stream in accord with a block size defined by the CDB. When the data byte count for a data stream has been reached for the data being sent to the destination(s) 628, the DPI is inserted. Multiple blocks of data may be moved for a given CDB such that the DPI is inserted into the transfer data stream multiple times for a single data stream.

An embodiment implementing the configuration 600 shown in FIG. 6 may retrieve a fixed portion of data (e.g., 1 kb of data) from each data source 602 one fixed portion of data at a time. Each fixed portion of data is then sent through the encrypt engine 610 and the encrypted result is sent to the second EEDP engine 624 and then on to the designated data destination(s) 524 for the encrypted data. The XOR processing is performed as the encrypted data is sent from the encrypt engine 610 to the second EEDP engine 624 and on to the data destination(s) 628 for the encrypt engine 610. Once a fixed portion of data has been retrieved from each data source 602 (e.g., 1 kb of data retrieved from each data source 602) and the encrypted data has been sent to the designated data destination(s) 628 for the encrypt engine 610 through the second EEDP engine 624, the results from the first XOR engine 614 are sent to the second EEDP engine 624 and on to the designated data destination(s) 628 for the first XOR engine 614. After the first XOR engine 614 results have been sent to the designated data destination(s) 628 for the first XOR engine 614, the second XOR engine 618 results are sent to the second EEDP engine 624 and on to the designated data destination(s) 628 for the second XOR engine 618. The processing of a fixed amount of data from each data source 602 is repeated until the last fixed amount (or less) of data has been retrieved. Which local modify data storage 612, 616, 620 is selected for streaming data to the second EEDP engine 624 matches the data stream (encrypt engine 610 result, first XOR engine result 614, or second XOR engine result 618) that is currently being transferred to the designated destination(s) 628.

Figure 7:
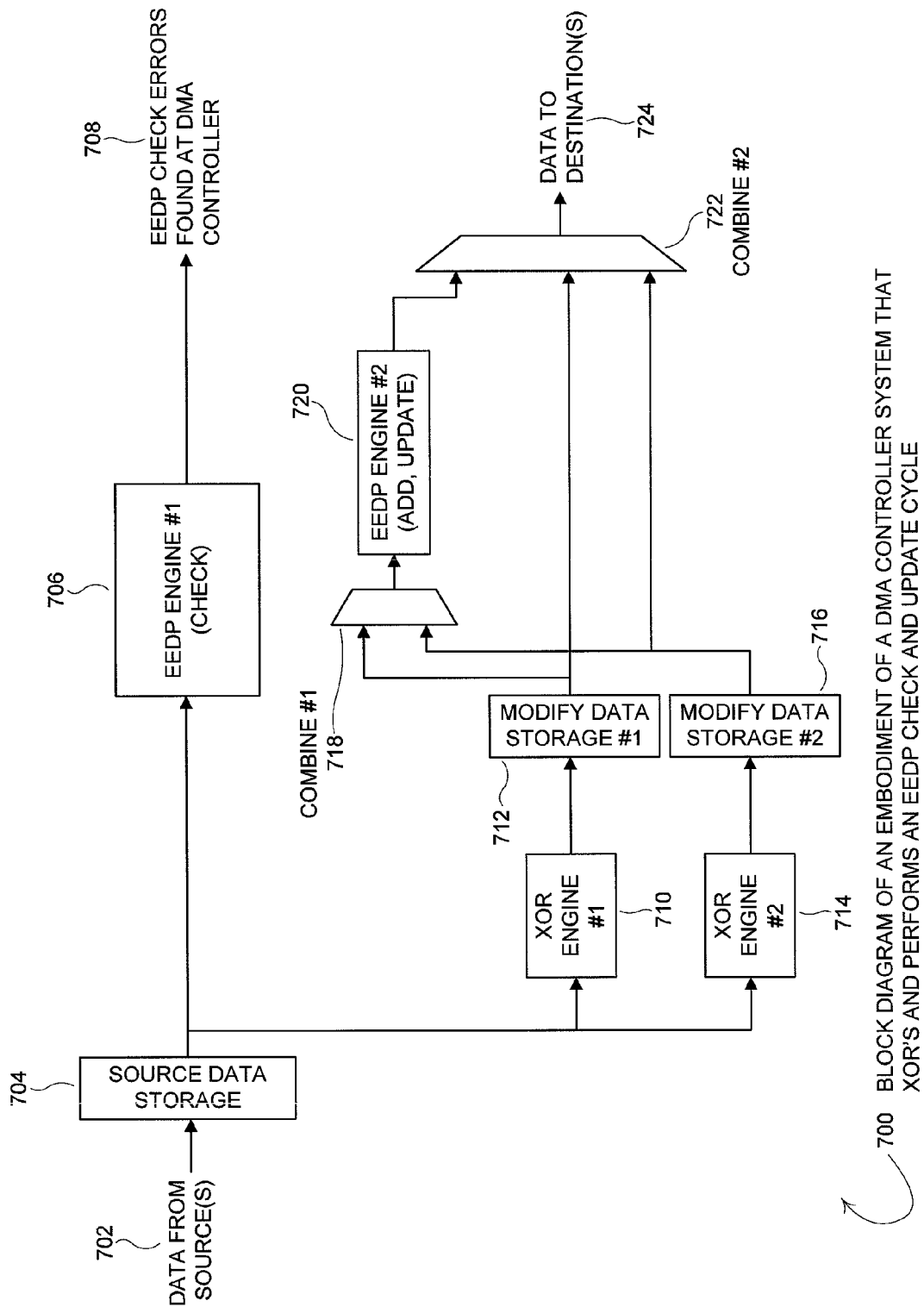
FIG. 7 is a block diagram of an embodiment of a DMA controller system that performs exclusive ORs (XORs) on the data and has an End-to-End Data Protection (EEDP) check and update cycle.

FIG. 7 is a block diagram 700 of an embodiment of a DMA controller system that performs exclusive ORs (XORs) on the data and has an End-to-End Data Protection (EEDP) check and update cycle. Data from the data source(s) 702 is stored in the source data storage 704 of the DMA controller as the data is received. The first EEDP engine 706, the first 710 and second 714 XOR engines, and the second EEDP engine 720 perform operations concurrently. The first EEDP engine 706 is a check EEDP engine that checks the DPI embedded in the received data to verify the DPI and reports any errors found 708 to the DMA controller. The errors found by the first EEDP check engine 706 may be recorded by the DMA controller system and/or may generate an interrupt if interrupt functionality is enabled. Each XOR engine 710 & 714 may need access to already calculated data in order to properly complete the calculations. Hence, the first XOR engine 710 may store result data in the first modify data storage 712. Likewise, the second XOR engine 714 may store result data in the second modify data storage 716. The XOR result data is delivered from the first 712 and second 716 modify data storage to the data destination(s) 724 and to the second EEDP add/update engine 720. The first XOR data from the first modify data storage 712, and the second XOR data from the second modify data storage 716 are combined and delivered to the second EEDP engine 720. The combination process 718 may be performed via a multiplexor, as an insertion of packets within the data stream in an identifiable manner, or as otherwise expected by the second EEDP engine 720. The second EEDP engine 720 actually combines two EEDP functions to either generate an updated DPI for the XOR data streams or to add the DPI to the currently transferring data stream. The updated DPI from the second EEDP add/update engine 720 is combined 722 with the first XOR data from the first modify data storage 712, and the second XOR data from the second modify data storage 716 and then sent to the desired destination(s) 724. The combination process 722 may be performed via a multiplexor, as an insertion of packets within the data stream in an identifiable manner, or as otherwise expected by the data destination. Various embodiments may insert the DPI at a block boundary in the transfer data stream in accord with a block size defined by the CDB. When the data byte count for a data stream has been reached for the data being sent to the destination(s) 724, the DPI is inserted. Multiple blocks of data may be moved for a given CDB such that the DPI is inserted into the transfer data stream multiple times for a single data stream.

For the embodiment 700 shown in FIG. 7, a fixed portion of data (e.g., 1 kb of data) may be retrieved from each data source 702 one fixed portion of data at a time. Each fixed portion of data is then sent simultaneously to the first 710 and second 714 XOR engines. As data is retrieved from the data source(s) 702, each XOR engine 710, 714 performs exclusive OR operations with the currently retrieved data and the data in the respective local modify data storage 712, 716 for XOR engine 710, 714. Once a fixed portion of data has been retrieved from each data source 702 (e.g., 1 kb of data retrieved from each data source 702), the results from the first XOR engine 710 are sent to the second EEDP engine 720 and on to the designated data destination(s) 724 for the first XOR engine 710. After the first XOR engine 710 results have been sent to the designated data destination(s) 724 for the first XOR engine 710, the second XOR engine 714 results are sent to the second EEDP engine 720 and on to the designated data destination(s) 724 for the second XOR engine 714. The processing of a fixed amount of data from each data source 702 is repeated until the last fixed amount (or less) of data has been retrieved. Which local modify data storage 712, 716 is selected for streaming data to the second EEDP engine 720 matches the data stream (first XOR engine result 710 or second XOR engine result 714) that is currently being transferred to the designated destination(s) 724.

Figure 8:
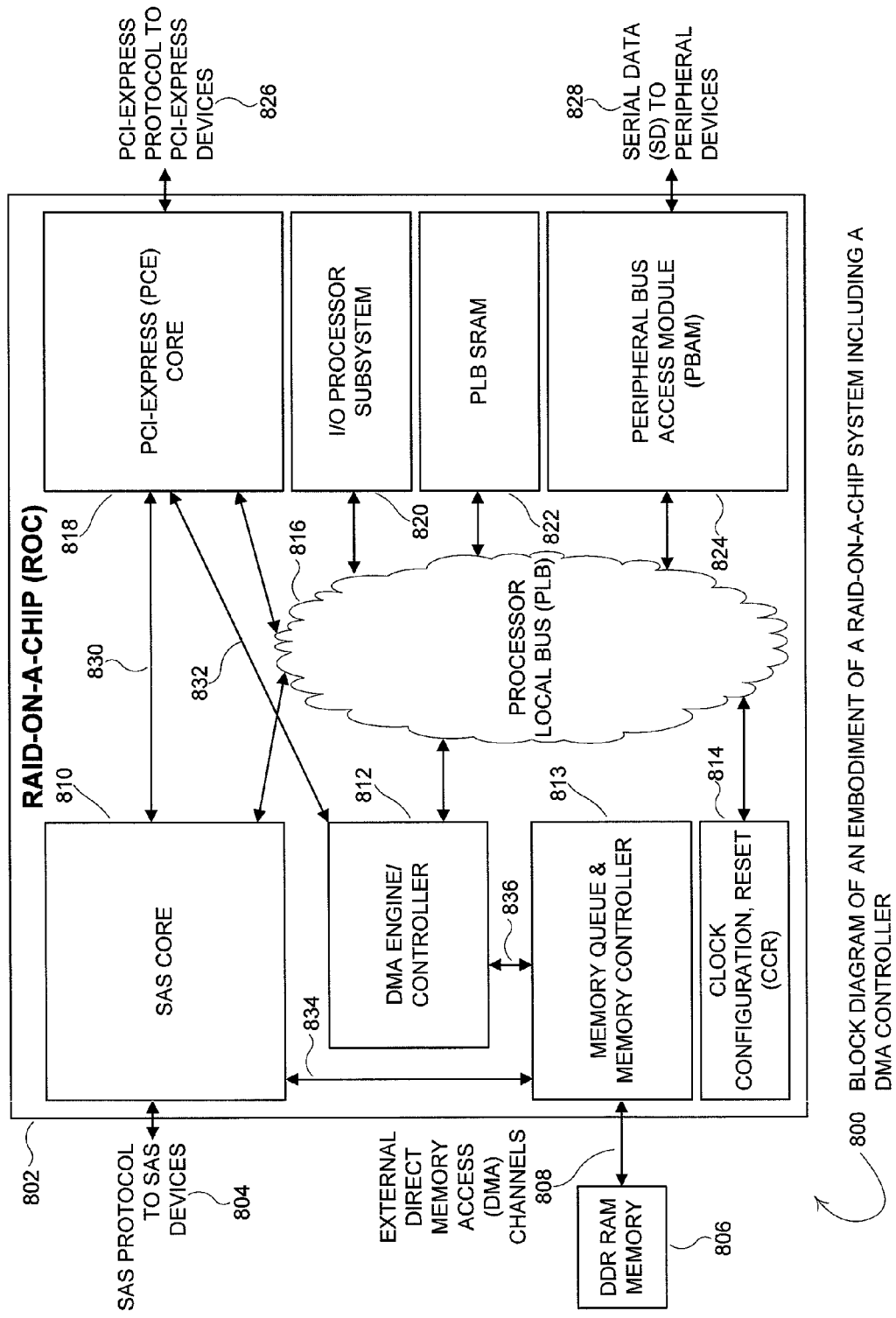
FIG. 8 is a block diagram of an embodiment of a RAID (Redundant Array of Independent Disks)-On-a-Chip (ROC) system that includes a DMA engine/controller.

FIG. 8 is a block diagram 800 of an embodiment of a RAID (Redundant Array of Independent Disks)-On-a-Chip (ROC) system 802 that includes a DMA engine/controller 812. The ROC 802 embodiment shown in FIG. 8 provides an example of the inclusion of a DMA engine/controller 812 on a multifunction chip. In the example ROC 802 embodiment shown in FIG. 8, the ROC 802 is comprised of several subsystems including: a Serial Attached SCSI (Small Computer System Interface) (SAS) core 810, a DMA engine/controller 812, a memory queue & memory controller 813, a clock configuration/reset subsystem (CCR) 814, a Peripheral Component Interconnect (PCI)-Express (PCE) core 818, an Input/Output (I/O) subsystem 820, a Processor Local Bus (PLB) Static RAM (SRAM) 822, and a Peripheral Bus Access Module (PBAM) 824. The various subsystems of the ROC 802 communicate with each other through the Processor Local Bus (PLB) 816 and/or via direct connections 830-836. The DMA engine/controller 812 has a direct connection 836 with the memory queue and memory controller 813 to control direct memory access channels 808 to the externally connected Double Data Rate (DDR) RAM memory 806. The memory queue and memory controller 813 may be incorporated with the DMA engine/controller 812 to form a single logical element of the ROC 802, but are shown separately to clearly show the location of the DMA engine/controller 812. The SAS core 810 provides external communication to and from SAS devices over a communication path permitting transmittal of SAS protocol communications 804. Likewise, the PCE core 818 provides external communication to and from PCI-Express devices over a communication path permitting transmittal of PCI-Express protocol communications 826. The PBAM provides external communication to and from Serial Data (SD) peripheral over a communication path permitting transmittal of Serial Data (SD) 828). The CCR 814, I/O Processor subsystem 820, and PLB SRAM 822 provide support functionality for interconnecting the various external communication subsystems (810, 812-813, 818, and 824).

In the ROC embodiment 802 shown in FIG. 8, the DMA engine/controller 812 has access to external DDR RAM memory 806 through the direct connection 836 to the memory queue and memory controller 813. Further, the DMA engine/controller 812 has connections to the other systems (810, 814, 818, 820, 822, 824) on the ROC 802 through the PLB 816. The DMA engine/controller 812 is connected to the remaining subsystems of the ROC embodiment 802 through the PLB 816. To enhance communication speeds, particularly for large data movements, some direct communication connections (830-836) between subsystems of the ROC 802 embodiment may be incorporated in addition to the PLB 816 connection. For instance, in the embodiment shown in FIG. 8, there is a direct communication connection 830 between the PCE core 818 and the SAS core 810. In the embodiment shown in FIG. 8, there is also a direct communication connection 832 between the DMA engine/controller 812 and the PCE core 818 as well as a direct communication connection 834 between the memory queue and memory controller 813 and the SAS core 810. Through the SAS core 810, the PCE core 818, and the PBAM 824, the DMA engine/controller 812 may communicate with SAS devices 804, PCI-Express devices 826, and serially connected peripheral devices 828. Various embodiments of an ROC 802 or other DMA enabled device/system may incorporate fewer or more external data communication connections as desired by a system designer.

Figure 9:
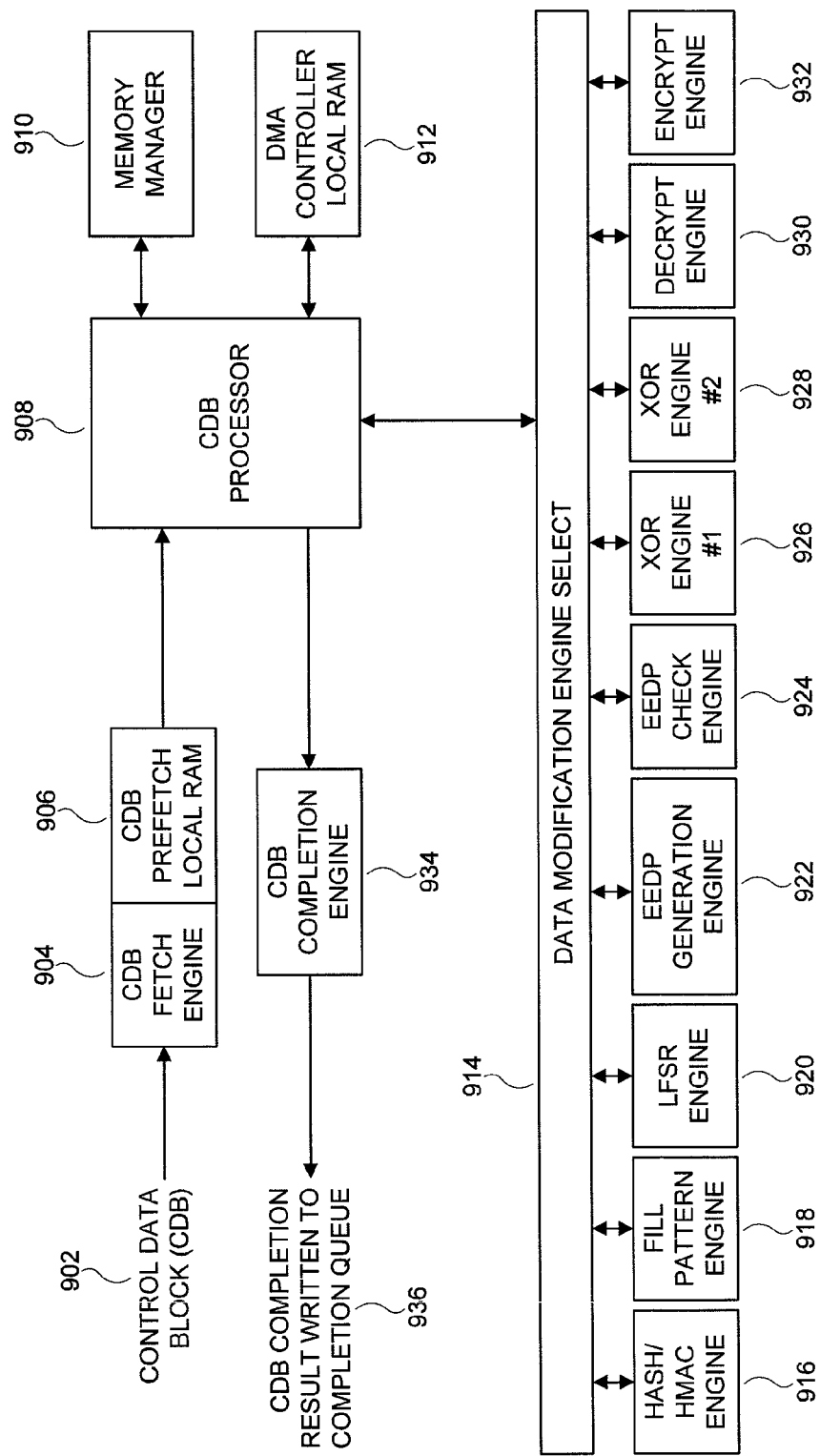
FIG. 9 is a block diagram of an embodiment of Control Data Block (CDB) processing for an embodiment of a DMA controller.

FIG. 9 is a block diagram 900 of an embodiment of CDB processing for an embodiment of a DMA controller. The CDB fetch engine 904 may fetch a CDB 902 and store the CDB in prefetch local RAM 906. The CDB fetch engine 906 analyzes the instructions embedded in the CDB 902 and directs the CDB processor 908 to perform the necessary actions to implement the instructions encoded in the CDB 902. The CDB processor 908 may also interact with the memory manager 910 to determine how much available space there is in the DMA controller local RAM 912. The CDB processor 908 may also interact with the DMA controller local RAM 912 to store data and modified data as necessary to transfer data and perform the desired plurality of data manipulations. The CDB processor 908 may select the appropriate data modification engine 914 from the data modification engines 916-932 available on the DMA controller. For the embodiment shown in FIG. 9, the available data modification engines include: a hash/HMAC engine 916, a fill pattern engine 918, a LFSR engine 920, an EEDP generation engine 922, an EEDP check engine 924, an XOR engine #1 (926), an XOR engine #2 (928), a decrypt engine 930, and an encrypt engine 932. The hash/HMAC engine 916 may be, either together or singly, a hash, HMAC, or hash/HMAC combined engine for the various embodiments. The fill pattern engine 918 may be used to fill modify storage with a fixed data pattern. Consequently, the fill pattern engine 918 does not require reading data from a data source since the pattern written is a fixed data pattern. The LFSR engine 920 also may not require reading data from a data source to perform the operations of the LFSR engine 920. Similarly, some data manipulation engines do not write data to a destination, but only performs checks on data received from a source, such as the EEDP check engine 924. Thus, for certain data manipulation engines (e.g., the fill pattern engine 918 and/or the LFSR engine 920), reading from data sources according to the CDB may not require reading any actual data from a data source. Likewise, for certain data manipulation engines (e.g., the EEDP check engine 924), writing data to data destinations according to the CDB may not require actual data being written to a data destination. The CDB processor 908 handles writing the data to the data destinations and tracking the performance of the data manipulation engines for a CDB. Once the CDB processor 908 completes all data movement for a given CDB 902, the CDB completion engine 934 writes the CDB completion results to the completion queue 936. The completion queue 936 may be located in memory external to the DMA controller/engine. When the data manipulation for a first CDB is nearing completion or is complete, various embodiments may also permit the Drain FSM 1012 to process writing data for the first CDB while the Fill FSM 1006 may begin the process of retrieving data for a second (i.e., next) CDB in order to enhance overall processing speed.

Figure 10:
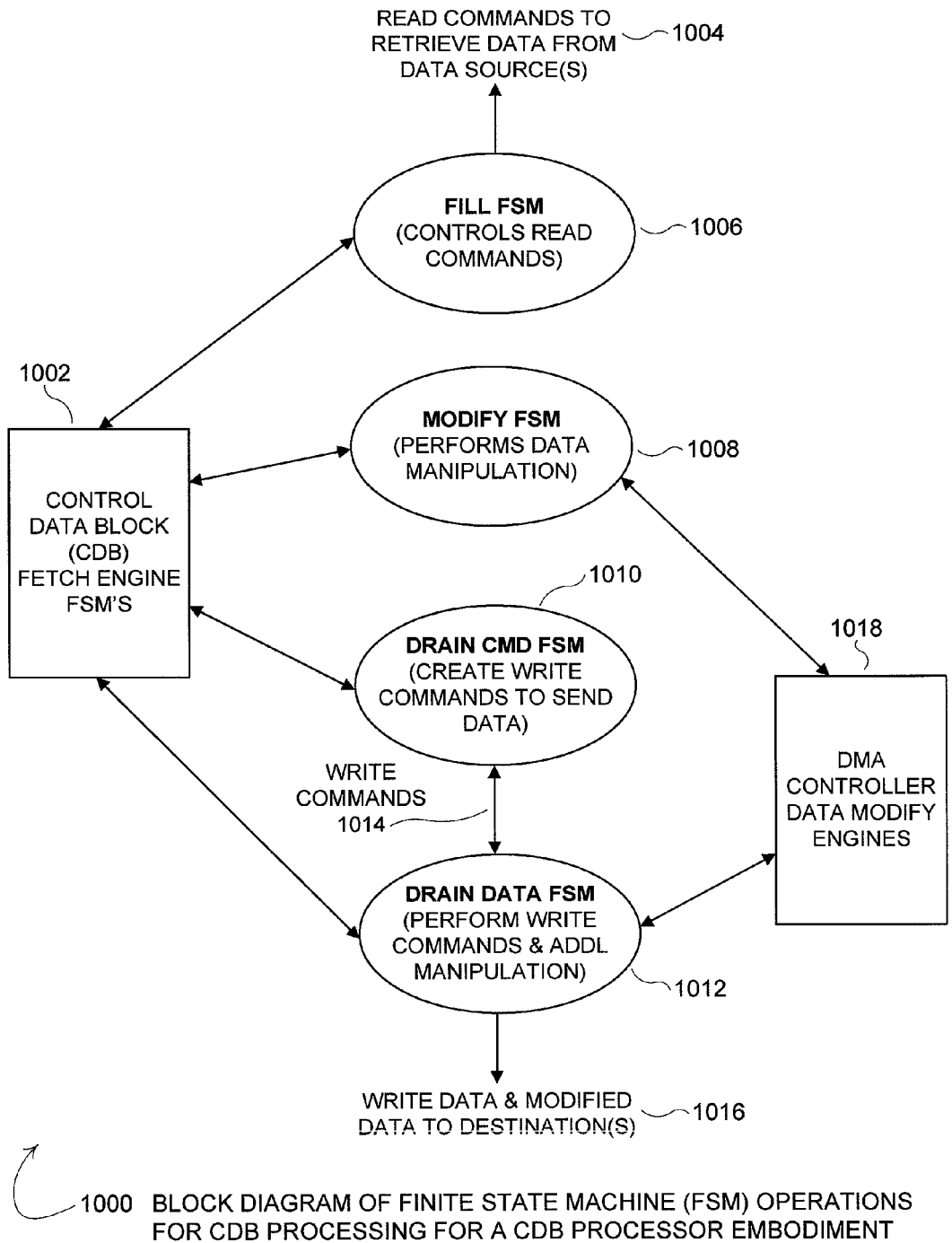
FIG. 10 is a block diagram of Finite State Machine (FSM) operations for CDB processing for a CDB processor embodiment.

FIG. 10 is a block diagram 1000 of Finite State Machine (FSM) operations for CDB processing for a CDB processor embodiment. The CDB fetch engine Finite State Machines (FSMs) 1002 analyzes the instructions embedded in a CDB and may interact with the four Finite State Machines (1006-1012) to perform the necessary actions to implement instructions embedded in a CDB received by the DMA controller. The Fill FSM 1006 receives instructions from the CDB fetch engine FSMs 1002 and controls the creation and issuing of read commands 1004 to retrieve data from the data source(s). The Modify FSM 1008 controls the performance of the data manipulation operations using the DMA controller data modify engines 1018 in accord with the instructions embedded in the CDB. The Drain Command (CMD) FSM 1010 creates the write commands that will instruct system to send the data and/or modified data from the data modify engines 1018 to the desired data destination(s) 1016. The Drain Data FSM 1012 performs the write commands created in the Drain Command FSM 1010 to write the data and/or modified data to the desired data destination(s) 1016. In some cases, the Drain Data FSM 1012 may also perform some of the data modification operations using the data modify engines 1018, such as for an EEDP generation that does not require buffering data in local DMA controller RAM in order to perform the data manipulation calculations.

Various embodiments may provide the control and management functions detailed herein via an application operating on a computer system, a Field Programmable Gate Array (FPGA), an Application Specific Integrated Circuit (ASIC), other programmable logic circuits, or other electronic devices. Embodiments may be provided as a computer program product which may include a computer-readable, or machine-readable, medium having stored thereon instructions which may be used to program/operate a computer (or other electronic devices) or computer system to perform a process or processes in accordance with the present invention. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device/electronic circuit or various portions may be spread over multiple computers/devices/electronic circuits that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method to perform a plurality of data modification operations on data being transferred via a Direct Memory Access (DMA) channel managed by a DMA controller comprising:

providing a plurality of data modification engines within said DMA controller that each perform at least one of a variety of data modification operations;

fetching a Control Data Block (CDB) by said DMA controller, said CDB containing instructions for reading said data from at least one data source, performing said plurality of data modification operations on said data, and writing said data to at least one destination;

retrieving by said DMA controller said data from at least one data source in accord with said instructions encoded in said CDB;

performing within said DMA controller each data modification operation of said plurality of data modification operations on said data received by said DMA controller using one of said plurality of data modification engines provided on said DMA controller for each data modification operation in accord with said instructions encoded in said CDB such that at least two of said plurality of data modification operations are performed concurrently by said DMA controller and a first data modification engine of said plurality of data modification engines creates first data results that are used as a basis of computation for a second data modification engine of said plurality of data modification engines to perform at least one data modification operation of said plurality of data modification operations; and sending by said DMA controller results of said plurality of data modification operations to at least one destination in accord with said instructions encoded in said CDB.

2. The method of claim 1 wherein said retrieving of said data from said at least one data source further comprises:

creating read commands within said DMA controller in accord with said instructions encoded in said CDB to read said data from said at least one data source;

sending said read commands from said DMA controller to said at least one data source; and receiving at said DMA controller said data from said at least one data source sent by said at least one data source in accord with said read commands.

3. The method of claim 1 wherein said sending of said results of said plurality of data modification operations to at least one destination further comprises:
  creating write commands within said DMA controller in accord with said instructions encoded in said CDB to write said results of said plurality of data modification operations to said at least one destination; and
  sending by said DMA controller said results of said plurality of data modification operations to said at least one destination in accord with said write commands.

4. The method of claim 1 further comprising storing said data retrieved by said DMA controller in an electronic memory that is included locally within said DMA controller.

5. The method of claim 1 further comprising storing said results of said plurality of data modification operations in an electronic memory that is included locally within said DMA.

6. The method of claim 1 wherein each data modification engine of said plurality performs at least one data modification operation of a group of data modification operations comprising: hash, Hash Message Authentication Code (HMAC), hash/HMAC combined, fill pattern, Linear Feedback Shift Register (LFSR), End-to-End Data Protection (EEDP) check, EEDP add, EEDP update, EEDP remove, exclusive OR (XOR), encryption, and decryption.

7. The method of claim 1 wherein said plurality of data modification engines is comprised of at least two of a single type of data modification operation such that said single type of data modification operation may be performed concurrently on said DMA controller.

8. The method of claim 1 wherein said sending of said results of said plurality of data modification operations to at least one destination further sends said original data retrieved by said DMA controller to said at least one data destination.

9. A Direct Memory Access (DMA) controller that performs a plurality of data modification operations on data being transferred via a Direct Memory Access (DMA) channel managed by said DMA controller comprising:
  a Control Data Block (CDB) processor subsystem that fetches a Control Data Block (CDB), said CDB containing instructions for reading said data from at least one data source, performing said plurality of data modification operations on said data, and writing said data to at least one destination;
  a fill subsystem that retrieves said data from at least one data source in accord with said instructions encoded in said CDB;
  a plurality of data modification engines within said DMA controller that each perform at least one of a variety of data modification operations for each data modification operation of said plurality of data modification operations on said data received by fill subsystem in accord with said instructions encoded in said CDB such that at least two of said plurality of data modification operations are performed concurrently by said DMA controller and a first data modification engine of said plurality of data modification engines creates first data results that are used as a basis of computation for a second data modification engine of said plurality of data modification engines to perform at least one data modification operation of said plurality of data modification operations; and
  a drain subsystem that sends results of said plurality of data modification operations to at least one destination in accord with said instructions encoded in said CDB.

10. The DMA controller of claim 9 wherein said fill subsystem retrieves said data from at least one data source by creating read commands in accord with said instructions encoded in said CDB to read said data from said at least one data source, sending said read commands to said at least one data source, and receiving said data from said at least one data source sent by said at least one data source in accord with said read commands.

11. The DMA controller of claim 9 wherein said drain subsystem sends said results of said plurality of data modification operations to at least one destination by creating write commands in accord with said instructions encoded in said CDB to write said results of said plurality of data modification operations to said at least one destination and sending said results of said plurality of data modification operations to said at least one destination in accord with said write commands.

12. The DMA controller of claim 9 further comprising a source data storage that stores said data retrieved by said fill subsystem, said source data storage being an electronic memory that is included locally within said DMA controller.

13. The DMA controller of claim 9 further comprising at least one modify data storage that stores said results of said plurality of data modification operations, said at least one modify data storage being an electronic memory that is included locally within said DMA.

14. The DMA controller of claim 9 wherein each data modification engine of said plurality performs at least one data modification operation of a group of data modification operations comprising: hash, Hash Message Authentication Code (HMAC), hash/HMAC combined, fill pattern, Linear Feedback Shift Register (LFSR), End-to-End Data Protection (EEDP) check, EEDP add, EEDP update, EEDP remove, exclusive OR (XOR), encryption, and decryption.

15. The DMA controller of claim 9 wherein said plurality of data modification engines is comprised of at least two of a single type of data modification operation such that said single type of data modification operation may be performed concurrently on said DMA controller.

16. The DMA controller of claim 9 wherein said drain subsystem further sends said original data retrieved by said DMA controller to said at least one data destination.

17. A Direct Memory Access (DMA) controller that performs a plurality of data modification operations on data being transferred via a Direct Memory Access (DMA) channel managed by said DMA controller comprising:
  means for providing a plurality of data modification engines within said DMA controller that each perform at least one of a variety of data modification operations;
  means for fetching a Control Data Block (CDB) by said DMA controller, said CDB containing instructions for reading said data from at least one data source, performing said plurality of data modification operations on said data, and writing said data to at least one destination;
  means for retrieving by said DMA controller said data from at least one data source in accord with said instructions encoded in said CDB;
  means for performing within said DMA controller each data modification operation of said plurality of data modification operations on said data received by said DMA controller using one of said plurality of data modification engines provided on said DMA controller for each data modification operation in accord with said instructions encoded in said CDB such that at least two of said plurality of data modification operations are performed concurrently by said DMA controller and a first data modification engine of said plurality of data modification engines creates first data results that are used as a basis of computation for a second data modification engine of said plurality of data modification engines to perform at least one data modification operation of said plurality of data modification operations; and means for sending by said DMA controller results of said plurality of data modification operations to at least one destination in accord with said instructions encoded in said CDB.

\* \* \* \* \*